United States Patent
Jöngren et al.

(10) Patent No.: US 8,804,867 B2
(45) Date of Patent: *Aug. 12, 2014

(54) METHOD AND APPARATUS FOR USING FACTORIZED PRECODING

(71) Applicant: Telefonaktiebolaget L M Ericsson (Publ), Stockholm (SE)

(72) Inventors: George Jöngren, Sundyberg (SE); David Hammarwall, Vallentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,458

(22) Filed: Nov. 1, 2013

(65) Prior Publication Data

US 2014/0056379 A1 Feb. 27, 2014

Related U.S. Application Data

(63) Continuation of application No. 12/951,270, filed on Nov. 22, 2010, now Pat. No. 8,605,809.

(60) Provisional application No. 61/264,495, filed on Nov. 25, 2009.

(51) Int. Cl.
H04B 7/02 (2006.01)

(52) U.S. Cl.
USPC ........... 375/267; 375/260; 375/299; 375/347; 375/349

(58) Field of Classification Search
USPC ..................... 375/267, 260, 299, 347, 349
See application file for complete search history.

(56) References Cited

U.S. PATENT DOCUMENTS

| | | |
|---|---|---|
| 2007/0160011 A1 | 7/2007 | Kim et al. |
| 2009/0052354 A1 | 2/2009 | Wu et al. |
| 2009/0066577 A1* | 3/2009 | Kim et al. ............ 342/373 |
| 2010/0027713 A1 | 2/2010 | Huang et al. |
| 2010/0111211 A1* | 5/2010 | Han et al. ............ 375/260 |
| 2011/0080901 A1* | 4/2011 | Lin et al. ............ 370/344 |

FOREIGN PATENT DOCUMENTS

| | | |
|---|---|---|
| EP | 2169845 A1 | 3/2010 |
| WO | 2007092539 A2 | 8/2007 |
| WO | 2008155707 A1 | 12/2008 |
| WO | 2008156067 A1 | 12/2008 |
| WO | 2009/025619 A2 | 2/2009 |

OTHER PUBLICATIONS

3rd Generation Partnership Project. "Further Refinements of Feedback Framework." 3GPP TSG-RAN WG1 #60bis, R1-101742, Beijing, China, Apr. 12-16, 2010, pp. 1-8.

(Continued)

*Primary Examiner* — Kabir A Timory
(74) *Attorney, Agent, or Firm* — Coats and Bennett, P.L.L.C.

(57) ABSTRACT

According to one or more aspects, the teachings herein improve user equipment (UE) Channel State Information (CSI) feedback, by letting the precoder part of a CSI feedback report comprise factorized precoder feedback. In one or more such embodiments, the factorized precoder feedback corresponds to at least two precoder matrices, including a recommended "conversion" precoder matrix and a recommended "tuning" precoder matrix. The recommended conversion precoder matrix restricts the number of channel dimensions considered by the recommended tuning precoder matrix and, in turn, the recommended tuning precoder matrix matches the recommended precoder matrix to an effective channel that is defined in part by said recommended conversion precoder matrix.

38 Claims, 4 Drawing Sheets

(56) References Cited

OTHER PUBLICATIONS

3rd Generation Partnership Project. "Possible Refinement on 8Tx Codebook Design." 3GPP TSG RAN WG1 60bis, R1-102104, Beijing, China, Apr. 12-16, 2010, pp. 1-7.

3rd Generation Partnership Project. "CQI and MIMO Feedback for LTE." 3GPP TSG RAN WG1 #50-bis Meeting, R1-074356, Shanghai, China, Oct. 8-12, 2007, pp. 1-2.

3rd Generation Partnership Project. "Persistent CQI/PMI/Rank Reporting on PUCCH/PUSCH." 3GPP TSG RAN WG1 Meeting #52, R1-080765, Sorrento, Italy, Feb. 11-15, 2008, pp. 1-2.

3rd Generation Partnership Project. "Multiple Granularity Feedback Design for LTE-A." 3GPP TSG-RAN WG1 #60, R1-101399, San Fransicso, CA, USA, Feb. 22-26, 2010, pp. 1-9.

3rd Generation Partnership Project. "Precoding Codebook Design for 4 Node-B Antenna." 3GPP TSG RAN WG1 48bis, R1-071798, St. Julian's, Malta, Mar. 26-30, 2007, pp. 1-11.

3rd Generation Partnership Project. "Configuration of Feedback Mode for MIMO Transmission." 3GPP TSG RAN WG1 Meeting #60, R1-101287, San Francisco, CA, USA, Feb. 22-26, 2010, pp. 1-2.

3rd Generation Partnership Project. "Way Forward for MU-MIMO Design." 3GPP TSG RAN WG1 Meeting #49bis, R1-073100, Orlando, FL, USA, Jun. 25-29, 2007, pp. 1-4.

3rd Generation Partnership Project. "PMI-Based Multi-Granular Feedback for SU/MU-MIMO Operation." 3GPP TSG-RAN WG1 #60, R1-100852, San Francisco,CA, USA, Feb. 22-26, 2010, pp. 1-5.

* cited by examiner

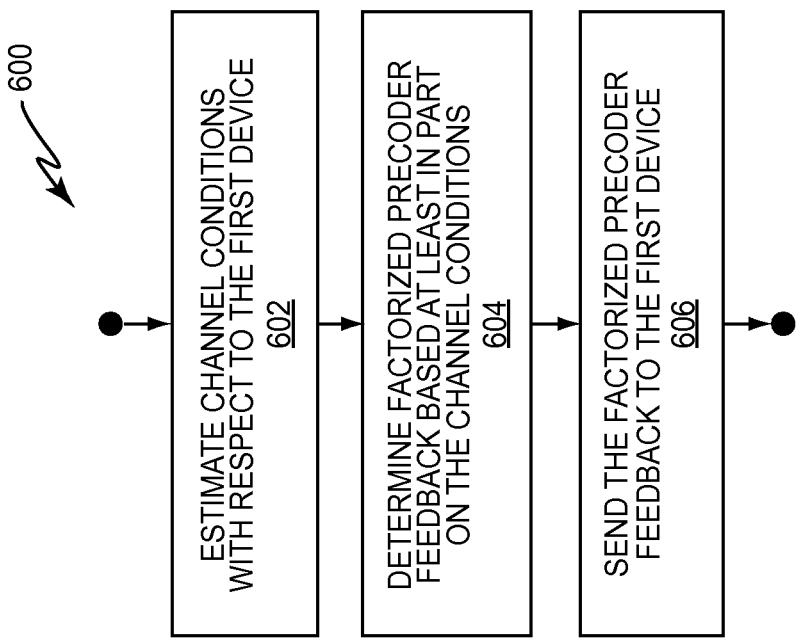
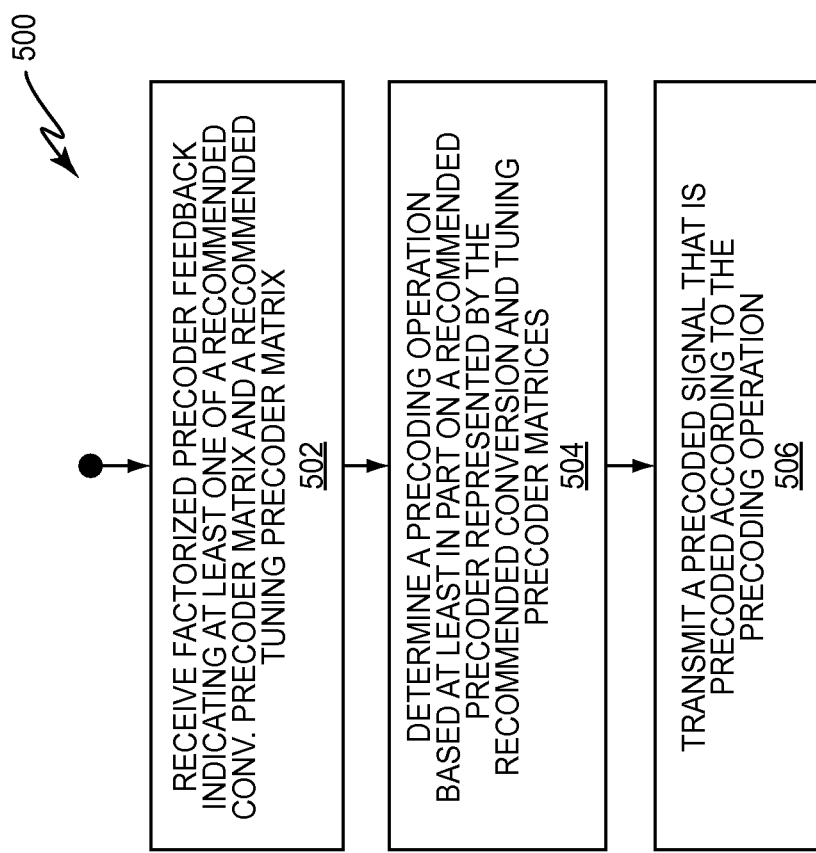

METHOD AND APPARATUS FOR USING FACTORIZED PRECODING

RELATED APPLICATIONS

This application is a continuation of U.S. patent application Ser. No. 12/951,270 filed 22 Nov. 2010, which claims priority from U.S. Provisional Patent Application No. 61/264,495 filed 25 Nov. 2009, all of which are hereby incorporated by reference herein in their entirety.

TECHNICAL FIELD

The present invention generally relates to transmit signal precoding and particularly relates to the use of factorized precoding.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. A current working assumption in LTE-Advanced is the support of an 8-layer spatial multiplexing mode with possibly channel dependent precoding. The spatial multiplexing mode is intended for high data rates in favorable channel conditions. According to such multiplexing, an information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space.

The precoder matrix is typically selected from a codebook of possible precoder matrices, and is typically indicated by means of a precoder matrix indicator (PMI), which specifies a unique precoder matrix in the codebook. If the precoder matrix is confined to have orthonormal columns, then the design of the codebook of precoder matrices corresponds to a Grassmannian subspace-packing problem. The r symbols in s each correspond to a layer and r is referred to as the transmission rank. In this way, spatial multiplexing is achieved since multiple symbols can be transmitted simultaneously over the same resource element (RE). The number of symbols r is typically adapted to suit the current channel properties.

LTE uses OFDM in the downlink (and DFT precoded OFDM in the uplink) and hence the received $N_R \times 1$ vector $y_n$ for a certain resource element on subcarrier n (or alternatively data RE number n), assuming no inter-cell interference, is thus modeled by $$y_n = H_n W_{N_T \times r} s_n + e_n$$

where $e_n$ is a noise vector obtained as realizations of a random process. The precoder, $W_{N_T \times r}$, can be a wideband precoder, which is constant over frequency, or frequency selective. The precoder matrix is often chosen to match the characteristics of the $N_R \times N_T$ MIMO channel H, resulting in so-called channel dependent precoding. This is also commonly referred to as closed-loop precoding and essentially strives to focus the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding, the UE transmits, based on channel measurements in the forward link (downlink), recommendations to the eNodeB of a suitable precoder to use. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other entities than precoders to assist the eNodeB in subsequent transmissions to the UE. Such other information may include channel quality indicators (CQIs) as well as transmission rank indicator (RI).

One problem with closed-loop precoding is the feedback overhead caused by signaling a precoder matrix indicator (PMI) and precoder rank indicator (i.e., a RI)—especially in systems with large antenna configurations where there are many channel dimensions to characterize. With the state-of-the art feedback design, the feedback overhead for systems with many transmit antennas will in many cases result in an unreasonable feedback overhead. Complexity also may be a problem if conventional feedback schemes are used as the antenna array sizes grow larger. In this regards, searching for the "best" precoder from among candidate precoder matrices in a large codebook is computationally demanding, as it essentially implies an exhaustive search over the large number of codebook entries.

SUMMARY

According to one or more aspects, the teachings herein improve user equipment (UE) Channel State Information (CSI) feedback, by letting the precoder part of a CSI feedback report comprise factorized precoder feedback. In one or more such embodiments, the factorized precoder feedback corresponds to at least two precoder matrices, including a recommended "conversion" precoder matrix and a recommended "tuning" precoder matrix. The recommended conversion precoder matrix restricts the number of channel dimensions considered by the recommended tuning precoder matrix and, in turn, the recommended tuning precoder matrix matches the recommended precoder matrix to an effective channel that is defined in part by said recommended conversion precoder matrix.

Further, the recommended conversion precoder matrix has row-column dimensions of $N_T \times k$, where the number of rows $N_T$ equals a number of transmit antenna ports at the first device and the number of columns k equals a conversion dimension that is less than the value of $N_T$, to thereby restrict the number of channel dimensions considered by the recommended tuning precoder matrix. The conversion precoder is typically, but not necessarily, reported with a coarser granularity in time and/or frequency than the tuning precoder to save signaling overhead and/or complexity.

A particular aspect is that the conversion dimension k is not necessarily equal to the number of antenna ports $N_T$ and is either configured by the first device, which, for example, may be an LTE eNodeB, or is configured by the second device, which, for example, may be an LTE mobile terminal or other type of UE. For a given $N_T$, the transmission rank r and conversion dimension k are related as $N_T \geq k \geq r$, hence several possible values of k and r are available. A particular aspect is that there is at least one combination of $N_T$ and r for which k can adopt at least two different values. Specifically, k can be strictly less than $N_T$, offering the possibility of dimension reduction. Another aspect is that there is at least one combination of $N_T$ and k for which r can adopt at least two different values.

The conversion and tuning precoder matrix recommendations, including selection of the conversion dimension k and the transmission rank r, are typically made by the second device, such that the second device uses the factorized precoder feedback to provide the first device with a recommended precoder matrix. Correspondingly, the first device receives the recommended precoder matrix by way of such feedback, but it does not necessarily follow such recommendation, but can derive channel state information from the feedback that is used to determine the applied precoding operation. An alternative contemplated herein is that some parts, or all of these parameters, are configured by the first device. These determinations are signaled from the first device to the second device, which uses that information to determine the remaining parameters representing a precoding recommendation.

BRIEF DESCRIPTION OF THE DRAWINGS

FIG. 5 is a logic flow diagram of one embodiment of a method of generating and sending factorized precoder feedback at a second device, to provide precoding recommendations to a first device.

FIG. 6 is a logic flow diagram of one embodiment of a method of receiving and evaluating factorized precoder feedback at a first device, where that factorized precoder feedback provides precoding recommendations from a second device.

DETAILED DESCRIPTION

Figure 1:
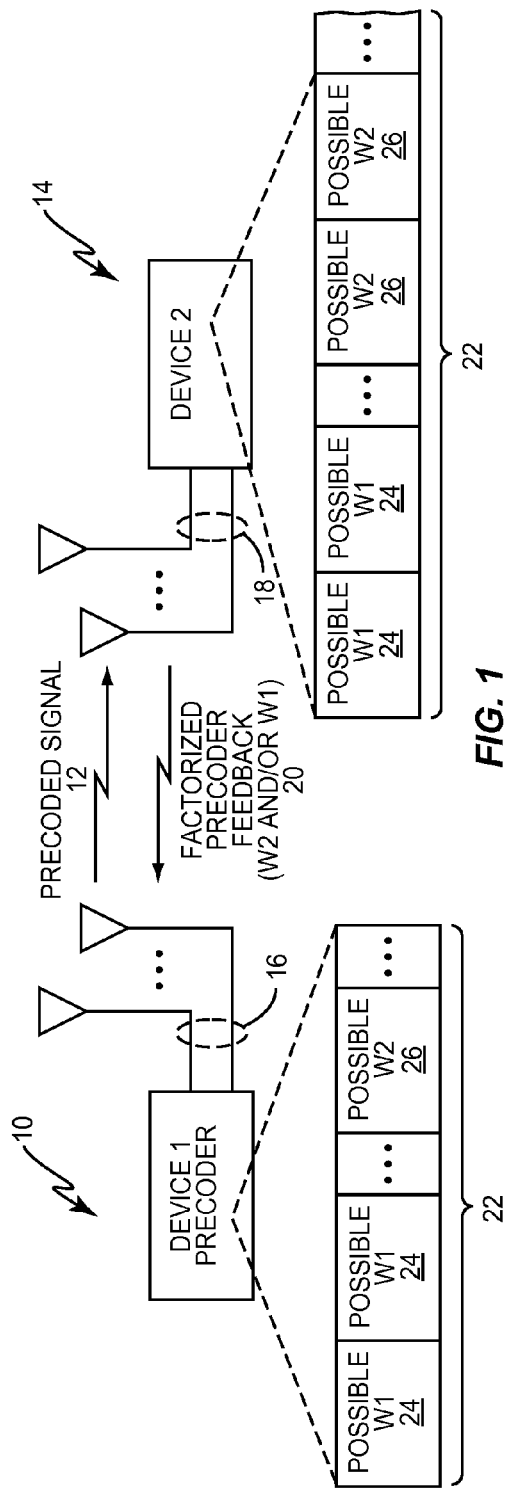
FIG. 1 is a block diagram of example embodiments of a first device and a second device, where the second device is configured to send precoding recommendations to the first device by way of factorized precoder feedback.

FIG. 1 illustrates a first device 10 ("Device 1") that transmits a precoded signal 12 to a second device 14 ("Device 2") using a number of transmit antennas 16. In turn, the second device 14 includes a number of antennas 18 for receiving the precoded signal 12 and for transmitting return data and signaling to the first device 10, including factorized precoder feedback 20. The factorized precoder feedback 20 comprises precoder recommendations for the first device 10. The first device 10 considers but does not necessarily follow the precoding recommendations included in the factorized precoder feedback 20 when determining the precoding operation it uses to generate the precoded signal 12. However, one advantageous aspect of the teachings presented herein, the factorized precoder feedback 20 offers significantly improved efficiency in terms of the processing required to determine the factorized precoder feedback 20 and/or in terms of the signaling overhead required for sending the factorized precoder feedback 20.

In at least one embodiment, the second device 14 recommends a precoder matrix to the first device 10 by indicating a recommended conversion precoder matrix to the first device 10 and/or by indicating a recommended tuning precoder matrix to the first device 10. In at least one such embodiment, the factorized precoder feedback 20 comprises signaling providing such indications to the first device 10. For example, in at least one embodiment, the second device 14 "maintains" (stores) one or more codebooks 22 that include a number of possible conversion precoder matrices 24 and a number of possible tuning precoder matrices 26. The first device 10 maintains the same one or codebooks 22 (or, equivalently, stores codebook information that derives from or depends on the codebook entries maintained at the second device 14).

In one or more such embodiments, the second device 14 sends Precoder Matrix Index (PMI) values, where those values identify the codebook entries representing precoder matrix recommendations to be considered by the first device 10 in determining the precoding operation to apply in generating the precoded signal 12. For example, representing the recommended precoder matrix by W, the factorized precoder feedback 20 in at least one embodiment comprises an index value identifying a particular one of the possible conversion precoder matrices 24 as a recommended conversion precoder matrix, denoted as $W_1$, and further comprises an index value identifying a particular one of the possible conversion precoder matrices 26 as a recommended tuning precoder matrix, denoted as $W_2$. The device 10 is correspondingly configured to form the recommended precoder matrix W as the product (matrix multiplication) of the recommended conversion precoder matrix $W_1$ and the recommended tuning precoder matrix $W_2$. That is, $W=W_1 \times W_2$. The device 10 considers the recommended precoder matrix W in determining the precoding operation it applies. For example, it formulates a precoder matrix used for generating the precoded signal 12 based at least in part on the recommended precoder W.

Thus, by receiving the factorized precoder feedback 20, the first device 10 is informed of the recommended conversion and tuning precoder matrices $W_1$ and $W_2$, and considers the CSI indicated by such feedback in determining its precoding operations. The first device 10 evaluates W, for example, to determine whether or not to conform its precoding operations to the recommended precoder matrix W. That is, the first device 10 receives and understands the factorized precoder feedback 20, but the precoding operation actually applied by the first device 10 may or may not follow the precoder recommendations from the second device 14. Actual precoding at the first device 10 depends on a number of factors beyond the recommendations received from the second device 10.

Figure 2:
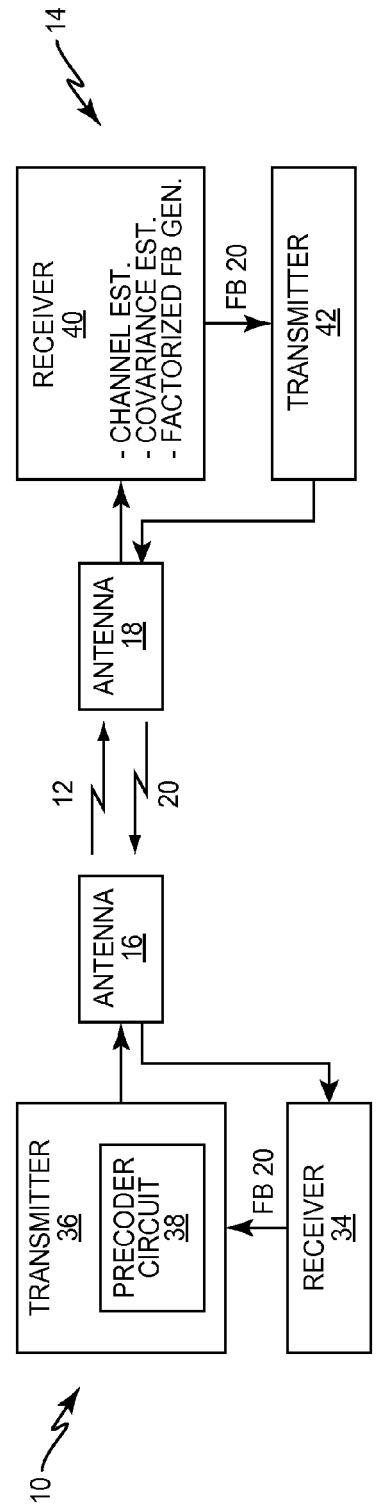
FIG. 2 is a block diagram of further example details for the devices introduced in FIG. 1.

As a non-limiting example, FIG. 2 illustrates one embodiment of the first and second devices 10 and 14. According to the illustrated example, the first device 10 comprises a receiver 34 configured to receive the factorized precoder feedback 20 from the second device 14. As discussed, the factorized precoder feedback 20 indicates at least one of a recommended conversion precoder matrix ($W_1$) and a recommended tuning precoder matrix ($W_2$) that jointly represent a recommended precoder matrix (W) that is a matrix multiplication of the recommended conversion and tuning precoder matrices. As will be further detailed later herein, the recommended conversion precoder matrix restricts the number of channel dimensions considered by the recommended tuning precoder matrix and the recommended tuning precoder matrix matches the recommended precoder matrix to an effective channel that is defined in part by the recommended conversion precoder matrix.

The first device 10 further comprises a transmitter 36 that includes a precoder circuit 38. The transmitter 36 is configured to determine a precoding operation for generating the precoded signal 12, based at least in part on evaluating said recommended precoder matrix. Here, the "precoding operation" will be understood as the precoding that actually is used by the first device 10 for generating the precoded signal 12, and it may or may not follow the recommended precoder matrix corresponding to the recommended conversion and tuning precoder matrices. The transmitter is 36 is configured to transmit the precoded signal 12 to the second device 14, where the precoded signal 12 is precoded according to precoding operation applied by the device 10.

In determining the actual precoding operation to use, the transmitter 36 is configured, for example, to determine whether or not to use the recommended precoder matrix as a precoder matrix actually used in the precoder circuit 38 for generating the precoded signal 12. That is, the precoding operation carried out by the first device 10 may or may not follow the recommended precoding operation, depending upon a number of conditions. However, it will be understood that the first device 10 may follow the recommendations and is, in any case, configured to understand and consider the factorized precoder feedback 20, as the basis for identifying such recommendations.

Figure 3A:
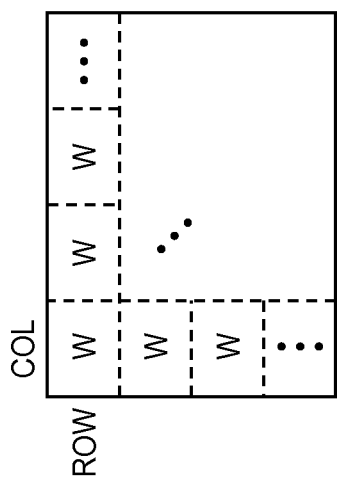
FIGS. 3A and 3B illustrate example codebooks for maintaining conversion and tuning precoder information in accordance with the teachings presented herein.

Further, in at least one embodiment, the first device 10 is configured to maintain the one or more codebooks 22 as a two-dimensional table 28 of possible precoder matrices. See FIG. 3A for an example table 28, wherein the table 28 will be understood to be, for example, a data structure stored in a memory of the device 10. The table 28 includes a number of numerical entries individually represented by "W" in the illustration. Each W is a possible precoder matrix formed as the matrix multiplication of a particular combination of possible conversion and tuning precoder matrixes 24 and 26. That is, some or all of the Ws in the table 28 each represents the product of a different pairing of a possible conversion precoder matrix 24 and a possible tuning precoder matrix 26. Thus, each row (or column) of the table 28 corresponds to a particular one in a plurality of possible conversion precoder matrices 24 and each column (or row) of the table 28 corresponds to a particular one in a plurality of possible tuning precoder matrices 26.

In such an embodiment, the factorized precoder feedback 20 comprises at least one of a row index value and a column index value, for identifying a particular one of said possible precoder matrices in the table 28 as the recommended precoder matrix. Each row (or column) index value can be understood as representing a particular conversion precoder recommendation, and each column (or row) index value can be understood as representing a particular tuning precoder recommendation.

Note that the row and column index values may be fed back with a different granularity, and note that with such embodiments the possible conversion precoder matrices 24 and the possible tuning precoder matrices 26 are not explicitly specified in separate codebooks; instead, the product of a particular possible conversion precoder matrix 24 and a particular possible tuning precoder matrix 26 is stored in a cell of the table 28.

It will be understood that in such embodiments the second device 14 also may be configured to maintain a like table 28 in a memory of the second device 14. In that manner, then, the second device 14 determines the table index value(s) corresponding to its precoder recommendations and sends indications of those values back to the first device 10 by way of the factorized precoder feedback 20. That is, the second device 14 sends back row index values and/or column index values, as the factorized precoder feedback 20. (To the extent that the first device 10 selects the conversion precoder, for example, the second device 14 need not necessarily send back both row and column index values.)

In another embodiment, such as that suggested in FIG. 1, the first device 10 is configured to maintain one or more codebooks 22 of possible conversion precoder matrices 24 and possible tuning precoder matrices 26. Correspondingly, the receiver 34 of the first device 10 is configured to receive the factorized precoder feedback 20 as at least one index value indicating at least one of: a particular one of the possible conversion precoder matrices 24 as the recommended conversion precoder, and a particular one of the possible tuning precoder matrices 26 as the recommended tuning precoder matrix.

Figure 3B:
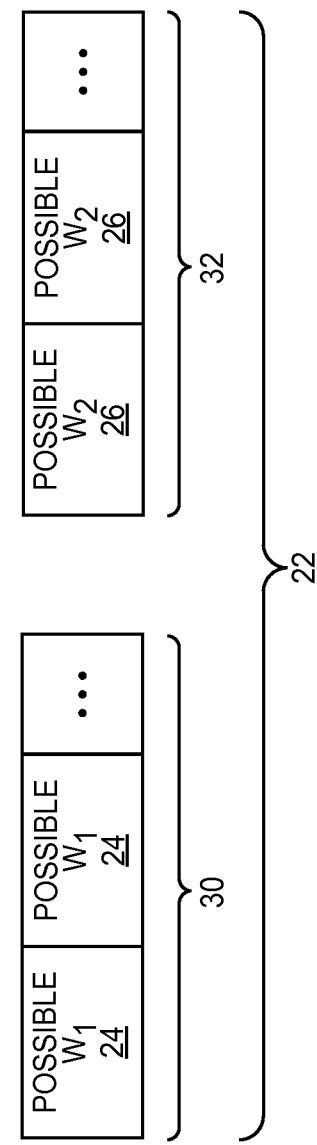

FIG. 3B illustrates an example of such an embodiment, where the first device 10 is configured to maintain the one or more codebooks 22 by maintaining a first codebook 30 of the possible conversion precoder matrices 24 and a second codebook 32 of the possible tuning precoder matrices 26. In such embodiments, the factorized precoder feedback 20 comprises at least one of a first index value for the first codebook 30 and a second index value for the second codebook 32. It will be understood that the second device 14 maintains copies of one or both of the codebooks 30 and 32.

Regardless of the particular codebook organization, in at least one embodiment, the first device 10 maintains one or more codebooks 22 of possible conversion precoder matrices 24 and possible tuning precoder matrices 26, where each possible conversion precoder matrix 24 has a particular configuration. In particular, each of the possible conversion precoder matrices has row-column dimensions of $N_T \times k$, where the number of rows $N_T$ equals a number of transmit antenna ports at the first device 10 and the number of columns k equals a conversion dimension that is less than the value of $N_T$ to thereby restrict the number of channel dimensions considered by the recommended tuning precoder matrix. It will be understood that the second device 14 may maintain like-structured codebook(s) 22.

Figure 4:
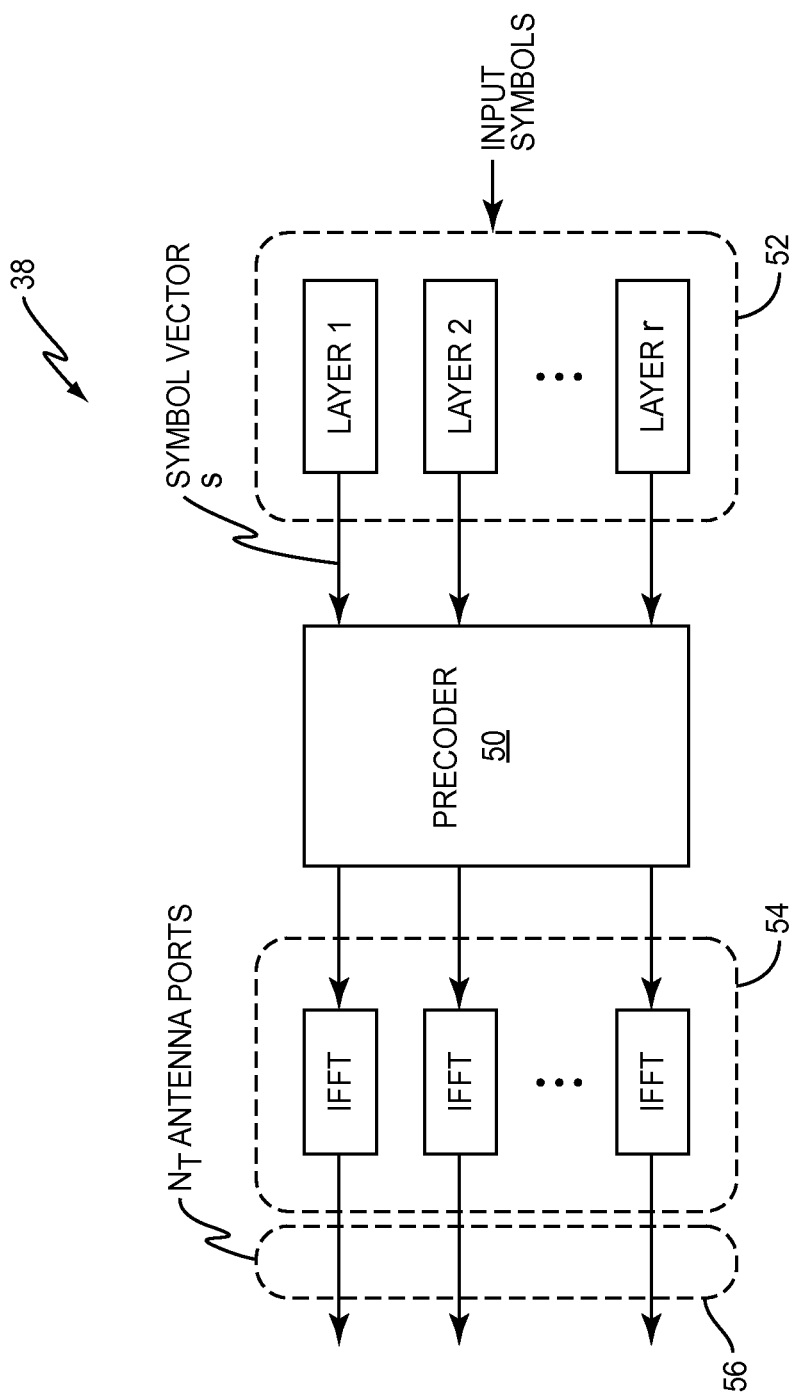
FIG. 4 is a block diagram of one embodiment of a precoder circuit configured for precoding transmissions in accordance with the teachings herein.

See FIG. 4 for an example implementation of the precoder circuit 38, including a precoder 50 that precodes signals for transmission by the first device 10 according to a precoding operation that, as noted, is determined at least in part based on evaluating the recommended precoder as determined from the factorized precoder feedback 20. In more detail, the precoder circuit 38 includes layer processing circuits 52 that process input symbols into a symbol vector s for each (spatial multiplexing) layer in use (e.g., "Layer 1," "Layer 2," and so on).

Those symbol vectors are precoded according to the actual precoding matrix adopted by the precoder 50 and the precoded vectors are passed into an Inverse Fast Fourier Transform (IFFT) processing circuit 54, and the outputs from that circuit are then applied to respective ones of the $N_T$ antenna ports 56. It will be understood that the number of antenna ports $N_T$ that are available for use by first device 10 in conducting precoded transmissions defines the maximum number of channel dimensions considered by the precoding operations of the first device 10. As will be explained in more detail later herein, the size and/or complexity of the one or more codebooks 22 (and that of the precoding feedback 20) can be advantageously reduced by restricting the number of channel dimensions considered to be less than $N_T$.

In the above embodiment, at least one of the possible conversion precoder matrices 24 comprises a block-diagonal matrix. Further, at least one of the possible tuning precoder matrices 26 has matrix rows that change a phasing of the blocks in the block-diagonal matrix. Here, each block in the block diagonal matrix can be understood in a beamforming sense to generate a set of beams emitting from a respective subset of the $N_T$ antenna ports 56, and the "phasing" at issue here represents the phase offsets between beams over both blocks of the block diagonal matrix.

Further, in at least one embodiment, the conversion dimension k is configured by the first device 10 or by the second device 14. That is, the conversion dimension k is a configurable parameter. In the case that the conversion dimension k is configured by the first device 10, the first device 10 is configured to signal an indication of the conversion dimension k from the first device 10 to the second device 14. Correspondingly, the second device 14 is, in such a case, configured to receive the signaled value of the conversion dimension k, and to consider that value in making its precoding recommendations—i.e., it constrains its selection of a recommended conversion precoder matrix in view of the signaled value of k.

Still further, in at least one embodiment, the recommended conversion precoder matrix is selected by the first device 10, rather than by the second device 14. In such a case, the first device 10 is configured to signal an indication of the recommended conversion precoder matrix to the second device 14. Correspondingly, the second device 14 is configured to receive an indication of the recommended conversion precoder matrix from the first device 10, and to use that signaled indication in its selection of a recommended tuning precoder matrix—i.e., the second device 14 constrains its consideration of possible tuning precoder matrices 26 to those matrices that are suitable (in terms of dimension) for use with the recommended conversion precoder matrix.

As a further advantage of the teachings herein, in one or more embodiments, the one or more codebooks 22 include a set of possible conversion precoder matrices 24, such that the number of unique vectors forming a particular column of the set of possible conversion precoder matrices is greater than the number of unique vectors forming another column of the set of possible conversion precoder matrices.

Further, in at least one embodiment, the first device 10 is configured to receive the factorized precoder feedback 20 from the second device 14 as first signaling received by the first device 10 at a first granularity in time or frequency that indicates the recommended conversion precoder matrix, and second signaling received by the first device 10 at a second granularity in time or frequency indicating the recommended tuning precoder matrix. In particular, the first granularity is coarser than the second granularity. Correspondingly, the second device 14 is configured to signal the recommended conversion precoder matrix at the first granularity, and to signal the recommended tuning precoder matrix at the second granularity.

More broadly, and with reference to FIG. 2, it will be understood that the second device 14 is configured to indicate a recommended precoder matrix to the first device 10. In support of that configuration, the example embodiment of the second device 14 comprises a receiver 40 that is configured to estimate channel conditions with respect to the first device 10. In this regard, the second device 14 receives, for example, antenna-specific reference signals for the $N_T$ antenna ports 56. These signals permit the receiver 40 to make per-antenna channel estimates, which allow the second device 14 to determine, for example, the number of spatial multiplexing layers that it can support and to thereby use that determination in making precoder recommendations to the first device 10.

Correspondingly, the receiver 40 is further configured to determine the factorized precoder feedback 20 based at least in part on the channel conditions. As noted before, the factorized precoder feedback 20 indicates at least one of a recommended conversion precoder matrix and a recommended tuning precoder matrix, where the recommended conversion and tuning precoder matrices jointly represent a recommended precoder matrix that is a matrix multiplication of the recommended conversion and tuning precoder matrices.

Also as before, the recommended conversion precoder matrix restricts the number of channel dimensions considered by the recommended tuning precoder matrix and the recommended tuning precoder matrix matches the recommended precoder matrix to an effective channel between the first and second devices 10 and 14 that is defined in part by the recommended conversion precoder matrix. The second device 14 further includes a transmitter 42 configured to send the factorized precoder feedback 20 to the first device 10, to indicate the recommended precoder matrix to the first device 10.

With the above first and second device examples in mind, FIG. 5 illustrates one embodiment of the method implemented in the first device 10 according to the teachings herein. The illustrated method 500 provides for precoding transmissions from the first device 10 to the second device 14. The method 500 includes receiving factorized precoder feedback 20 from the second device 14 (Block 502), where that feedback indicates at least one of a recommended conversion precoder matrix and a recommended tuning precoder matrix (with the structure/nature previously detailed). The method 500 further includes determining a precoding operation (for precoding to the second device 14) based at least in part on evaluating said recommended precoder matrix (Block 504). Still further, the method includes transmitting a precoded signal 12 to the second device 14 that is precoded according to the determined precoding operation (Block 506).

FIG. 6 illustrates a corresponding example of a method 600 implemented in the second device 14, where that method includes estimating channel conditions with respect to the first device 10 (Block 602), and determining factorized precoder feedback 20 based at least in part on the channel conditions (Block 604). As before, the factorized precoder feedback 20 indicates at least one of a recommended conversion precoder matrix and a recommended tuning precoder matrix. The method 600 further includes sending the factorized precoder feedback 20 to the first device 10 (Block 606), to indicate the recommended precoder matrix to the first device 10.

As a further example, in one or more embodiments taught herein, at least some aspects of precoder recommendations are based on determining the square-root of channel covariance. This processing thus ties in with the estimation of channel conditions between the first and second devices 10 and 14. In at least one such embodiment, the first device 10 is an eNodeB, e.g., in an LTE-based wireless communication network. Correspondingly, the second device 14 is a mobile terminal or other item of user equipment (UE) configured for operation in the LTE-based wireless communication network.

The eNodeB determines a precoder matrix to use for precoding a transmission to the UE, where that determination is made based at least in part on considering precoder recommendations from the UE, provided in the form of factorized precoder feedback 20 as previously discussed. In particular, one method of the UE determining precoder recommendations for the eNodeB is based on the following:

1. The UE estimates the $N_R \times N_T$ channel matrix $H_n$ for a set of Orthogonal Frequency Division Multiplexing (OFDM) resource elements (REs), where such estimates are based on antenna-specific reference signals from the eNodeB.

2. The UE forms an estimate of the transmit channel covariance matrix $R_{tr} = E[H^*H]$ by, for example, forming the sample estimate $$\hat{R}_{tr} = \frac{1}{N} \sum_n \hat{H}_n^* \hat{H}_n,$$

where the summation is over a set of REs. Such averaging taken over a set of REs in time exploits the fact that correlation properties of the channel may often change slowly over time while a similar averaging over frequency exploits the fact that correlation properties may be rather constant over frequency. Thus a typical operation is that the averaging is conducted over the entire system bandwidth (e.g., the overall bandwidth of the involved OFDM carrier) and involves multiple subframes over time. A weighted average may also be formed to take into account that correlation properties eventually become outdated time-wise or frequency-wise.

3. The UE then takes a matrix square-root of $\hat{R}_{tr}$, for example, $\hat{R}_{tr}^{1/2} = V\Lambda^{1/2}$, where V are the eigenvectors of the transmit channel covariance matrix and the diagonal matrix $\Lambda^{1/2}$ contains the square-root of the corresponding eigenvalues sorted in descending order. (Note that other forms of matrix square-roots exist and it is contemplated herein that such other forms may be used.)

4. The UE now hypothetically assumes a certain value of the conversion dimension k (which implicitly limits the transmission rank to k). This implies that only the first k columns of $\hat{R}_{tr}$ are kept. These columns are scaled to some fixed Frobenius norm and then quantized element-wise.

5. The recommended conversion precoder matrix ($W_1$) is now fixed for the hypothetical value of k to correspond to the column-pruned, quantized and scaled square-root of the transmit channel covariance matrix.

6. The UE now hypothetically assumes a certain value of the transmission rank r given the hypothetical k.

7. The UE now faces a new effective channel $H_n W_1$ for which it tries to select a matching hypothetical tuning precoder (matched over a set of REs, e.g. a subband in LTE) to optimize some performance metric. For example, the selection may optimize, for example, a predicted throughput, or may aim for the highest transport format giving a BLER not higher than 10%. The tuning precoder may be selected from a codebook $W_{tu} = \{\tilde{W}_{2,1}, \tilde{W}_{2,2}, \ldots\}$. That is, the plurality of possible tuning precoders 26 shown for the codebook 32 in FIG. 3B may comprise a finite set of choices of different tuning precoders $\tilde{W}_{2,1}$, $\tilde{W}_{2,2}$, and so on, for the hypothetical value of the conversion dimension k and the transmission rank r. Different ones of such sets may be maintained for different values or k and r. The tuning precoder codebook(s) could, for example, correspond to the relevant transmission rank of the 2 or 4 antenna port codebook available in LTE Rel-8.

8. The UE then performs a search over several or all different possible combinations of k and r by repeating Steps 4 to 7 above, and finally selects the overall best combination of conversion and tuning precoder matrices, including the choice of k and r. Here, the "best" combination may be the combination of a possible conversion precoder 24 and a possible tuning precoder 26 from the codebook(s) 22 that yields the highest or otherwise best value of the chosen performance metric chosen. Alternatively, the best conversion dimension k has been selected and reported in a previous time instance but still applies and only the rank r is determined, based on the previously determined conversion dimension, by repeating Steps 4-7.

9. Continuing, the UE converts the scalar quantized elements of the recommended conversion precoder into a bit-sequence that is encoded and sent to the eNodeB. Similarly, an index pointing into the tuning precoder codebook is also reported. This latter index could directly correspond to the PMI reported in LTE. Note, too, that instead of scalar quantization the recommended conversion precoder can also be selected from a codebook by, for example, selecting the possible conversion precoder 24 that matches the transmit covariance in the sense of maximizing receive signal-to-noise ratio (SNR) or ergodic channel capacity measures. Further, even if the factorized precoder feedback signaling is conducted using scalar quantization, the UE still may have an internal conversion precoder codebook, as a way to enforce desirable properties onto the conversion precoder matrix that is selected as the recommended conversion precoder matrix, prior to rounding to nearest scalar quantization.

Further, as previously noted, the actual feedback reporting can be conducted in a number of ways. For example, in LTE, feedback reporting could be performed on the uplink control channel PUCCH, to periodically convey Channel State Information (CSI) to the eNodeB, where that CIS may include the factorized precoder feedback that is of interest herein. CSI may also be conveyed by explicitly requesting CSI reporting on the PUSCH. In one or more embodiments, the UE reports a single recommended conversion precoder matrix on the PUSCH, together with reporting multiple recommended tuning precoder matrices, each such tuning precoder targeting a particular subband of the overall system bandwidth. It is also contemplated to change the content of the PUSCH-based reporting, so that sometimes the recommended conversion precoder matrix is transmitted and for other subframes the recommended tuning precoder matrix or matrices are transmitted.

Which recommendations to transmit from the UE to the eNodeB are, in one or more embodiments, signaled as part of the uplink grant on the PDCCH. For example, the grant includes a bit or some available bit combination that the UE interprets as an indicator of which recommendations to send. In support of this method, a strict timing relationship can be established between the different precoder reports recommendations from the UE, so that it is clear to both the UE and the eNodeB as to which time/frequency resources correspond to a particular precoder matrix recommendation by the UE. As a useful alternative, the UE is configured to transmit its conversion precoder matrix recommendations at a higher point in the protocol stack, as a Medium Access Control (MAC) element or by means of Radio Resource Control (RRC) protocol signaling.

Further, the eNodeB is not necessarily aware of how the UE selects the precoders it recommends. In fact, the typical case is that the UE does not know, and rather only knows that the UE somehow prefers the precoders it reports. In particular, the eNodeB may be unaware of the basis on which the UE recommends a particular conversion precoder matrix. An alternative contemplated for one or more embodiments herein is to specify that the conversion precoder matrix should be selected based on the square-root of the transmit channel covariance, or even that the transmit covariance matrix as a whole is fed back from the UE to the eNodeB. Such an approach however presents certain challenges in terms of testing and ensuring similar UE behaviors across multiple UE vendors.

These challenges arise because channel properties such as transmit channel covariance seen only internally in the UE are not easy to observe from the outside and hence there are no easy ways of ensuring that the reported covariance has the correct values, particularly because parts of the receiver front end in the UE might affect the covariance. An explicitly reported precoder, in contrast, assumes a hypothetical transmission and as such the consequence, in terms of a transport format giving around 10% BLER for the hypothetical transmission, is reported by means of CQI. This is observable by inspecting the ACK/NACKs of the UE and estimating BLER. These aspects of feedback reporting are not restricted to any particular embodiment described herein, and are applicable to the following further details.

In at least one embodiment, the conversion dimension k is adapted for matching different correlation properties of the channel. In this regard, selecting the conversion dimension k serves as a way of strictly confining the transmit energy to a reduced dimensionality subspace of the $N_T$-dimensional vector space. Roughly speaking, this focuses the energy in certain preferred "directions" and thus avoids the need for the tuning precoder to cope with a larger than necessary subspace. For example, the codebook(s) 22 include a number of possible conversion precoder matrices 24 that are restricted (by the k dimension) to a subspace of the $N_T$ dimensional vector space, and the set(s) of possible tuning precoder matrices 26 are thereby simplified.

Otherwise, forcing the tuning precoder matrix to consider the full NT dimensional vector space would require a bigger codebook and thus higher signaling overhead between the UE and the eNodeB and/or require higher complexity in the precoder search at the UE and/or the eNodeB. To understand why adapting the value of the conversion dimension k is advantageous, consider a scenario with four co-polarized and closely spaced (about half a wavelength) transmit antennas at the eNodeB. For purposes of this example, the first device 10 may be understood as the eNodeB and its antennas 16 therefore comprise the four co-polarized and closely spaced antennas. If the angular spread at the eNodeB is sufficiently small, the channels corresponding to the different transmit antennas will be highly correlated and the transmit channel covariance will consequently have one very strong eigenvalue and the remaining eigenvalues will be weak. For such a channel, single-layer beamforming is appropriate.

The above can be implemented by means of factorized precoding as follows:

$$W_1 = w_{BF}$$

$$W_2 = 1 \quad (1)$$

giving the effective precoder $$W_{\mathit{eff}} = w_{BF} \times 1 = w_{BF} \quad (2)$$

Here, the conversion dimension k is equal to 1 and the transmission rank r is also equal to one, while $w_{BF}$ is a single-layer beamformer that focuses all the transmit energy in the "strongest direction" of the channel, thus improving the SINR at the receive side. In this case, the UE would report information that describes or otherwise indicates the recommended conversion precoder matrix, while the corresponding recommended tuning precoder matrix is constant and thus no bits need to be expended for reporting of it.

The beamformer could be taken from a codebook based on columns of Discrete Fourier Transform (DFT) matrices, forming a grid of beams to select from. Alternatively, the beamformer can be based on the transmit covariance matrix of the channel. However, as the angular spread increases, the eigenvalues of the transmit covariance matrix of the channel become more similar. Consequently, the strongest eigenvalue no longer dominates as much as before. It may then be beneficial to allocate some power to more than one direction. Hence, it makes sense to make the conversion dimension k larger than 1. At the same time, the transmission rank r might remain at 1, e.g., because the SNR is not sufficiently high to warrant multi-rank transmission. In such a case, k>1 and r=1. For k=2, the recommended tuning precoder matrix could be chosen from the two antenna port precoder in LTE Rel-8, i.e. as, $$W_2 \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\} \quad (3)$$

The latter case of conversion dimension of two also makes sense if the antenna array at the eNodeB consists of several closely spaced cross-poles. Each polarization then forms a group of co-polarized and closely spaced antennas for which the channel correlation is high if the angular spread is sufficiently low. Beamforming on each polarization is then reasonable and is followed by a tuning precoder that tries to adjust the relative phase between the two polarizations. The recommended precoder matrix W can be tailored for such operation by determining W as an effective precoder matrix $W_{\mathit{eff}} = W_1 W_2$, where the recommended conversion precoder matrix $W_1$ and the recommended tuning precoder matrix $W_2$ could take the form of $$W_1 = \begin{bmatrix} w_{BF} & 0 \\ 0 & w_{BF} \end{bmatrix} \quad (4)$$

$$W_2 \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

The above details demonstrate that the possibility of choosing between different values of the conversion dimension k is beneficial. The actual selection of k can be conducted in a manner similar to the search conducted in the exemplary embodiment concerning determining which of the possible conversion precoder matrices 24 to recommend based on matrix square-roots.

Transmission rank adaptation is a further aspect in one or more embodiments taught herein. That is, the transmission rank r is varied as well. It is recognized herein that it is important to allow r to vary even though the conversion dimension k and the number of transmit antenna ports $N_T$ remain fixed. Consider again the case of a transmit antenna array with several closely spaced cross-poles. As shown above, the conversion precoder $W_1$ may take on the block-diagonal form $$W_1 = \begin{bmatrix} w_{BF} & 0 \\ 0 & w_{BF} \end{bmatrix}. \quad (5)$$

The conversion dimension k is here equal to two, corresponding to the two orthogonal polarizations, thus also implying that the appropriate tuning precoder has two rows. The tuning precoder could however either have one or two columns, depending on the transmission rank r that is deemed supportable by the channel. For example, if the SINR is low, single layer transmission is likely to be preferred. Still maintaining k=2 is beneficial because it allows the tuning precoder to adjust the relative phases between the two polarizations and thus achieve coherent combining of transmit signals on receive side. However, if the SINR is high, using two layers is likely to be better than only using a single layer, and the tuning precoder would consequently have two columns.

The tuning precoder matrix that is recommended for use therefore could be selected from a codebook of unitary 2×2 matrices that strive for orthogonalizing the effective 2×2 channel formed by the product of the channel matrix and the conversion precoder. Similar arguments apply for clustered antenna arrays where groups of antennas have channels with high correlation but where the correlation between groups is low, thus needing a tuning precoder for phase adjustments. It will be understood that the one or more codebooks 22 may be populated with a larger set of possible tuning precoder matrices 26, wherein one or more defined subsets of them have the above properties. (In general, given subsets of the possible tuning precoder matrices 26 in the codebook(s) 22 will correspond to given values of the conversion dimension k and transmission rank r, so that a tuning precoder matrix is selected that is appropriate for the selected conversion precoder matrix.)

Another aspect of in one or more embodiments taught herein is eNodeB assisted precoder selection. Even though the precoder recommendations are typically performed by the UE, because the UE generally has better downlink channel measurements, the factorized precoder design presented herein advantageously allows for a design where the eNodeB assists in the precoder selection. Such assistance is based on, for example, channel measurements in the reverse link (the uplink) where reciprocity can be applied to acquire channel information for the downlink. eNodeB assisted precoder selection is particularly suitable for time division duplex (TDD) systems where reciprocity can be accurately utilized, but also frequency division duplex (FDD) systems can benefit from such assistance by exploiting large scale parameters of the channel which are reciprocal also over larger duplex distances.

One such example embodiment is to let the eNodeB (and not the UE) select the conversion dimension k and signal the selected conversion dimension to the UE by means of forward signaling, in which case the UE determines k by decoding the message sent from the eNodeB. In this configuration the UE will be constrained to report a conversion precoder satisfying the configured conversion dimension. Such a configuration has the advantage that an eNodeB could take factors into account in the selection that are not available at the UE, such as the presence of co-scheduled UEs in case of downlink Multi-User Multiple-Input-Multiple Output (MU-MIMO). Such a solution therefore can be beneficial even though the channel measurements are typically more accurate at the UE.

In a further example embodiment, the eNodeB additionally makes the conversion precoder matrix recommendation and signals that selection to the UE by means of forward signaling. In such cases, the UE determines k and the conversion precoder selection based on decoding that signaling. In such a configuration, the UE is constrained to the conversion precoder matrix selection made by the eNodeB when determining its tuning precoder recommendation.

Further as to MU-MIMO, when scheduling multiple UEs on the same time-frequency resource, it is essential that the eNodeB be able to spatially separate the streams for the simultaneous transmissions. For such applications, the setting of the conversion dimension k should be less restrictive, so that not just a few dominating eigenmodes of the channel are characterized, but also the moderately strong eigenmodes in which the UE is still sensitive to interference. This approach can be achieved by letting the eNodeB select the conversion dimension k as in line with the embodiments above, or, if the UE selects the conversion dimension, by the following example embodiment: the eNodeB can configure the restrictiveness of the criterion the UE applies for selecting the conversion dimension k. To be effective, a similar configuration should be set for the selection of the rank r.

As further consideration herein, note that the conversion dimension k determines how many channel dimensions ($N_T-k$) that are strictly truncated (not quantized) with respect to the factorized precoder feedback 20. The columns of the recommended conversion precoder matrix determine the actual channel dimensions that are to be quantized. It could, however, be useful to have a smoother transition between the quantized dimensions and the truncated dimensions. Such a smooth transition is achieved in one or more embodiments herein by letting the codebook entries for the possible tuning precoder matrices 26 be such that tuning precoder matrix rows are quantized with different resolution. As an example for any given one of the possible tuning precoder matrices 26 in the one or more codebooks 22, the first row of the matrix has the highest resolution, and the resolution decreases with increasing row index (the last row has the coarsest quantization resolution).

With such a tuning precoder codebook design, the column ordering of the conversion precoder matrix becomes relevant, because each column is associated with a corresponding row of the tuning precoder matrix. Hence, if decreasing quantization resolution of the tuning precoding rows is implemented, more tuning precoder feedback bits will be spent on selecting the rotations of the first conversion precoder matrix column than on the last conversion precoder matrix column. The columns of the conversion precoder matrix thus should be ordered such that the first column represents the most important channel dimension and the last column the least important (of the k most important) channel dimensions ("directions"). Broadly, then, one or more embodiments taught herein uses codebook entries that quantize the rows of the possible tuning precoder matrices 26 with different resolutions.

With the above variations in mind, the teachings disclosed herein provide a solution for operating with closed-loop spatial multiplexing as well as with MU-MIMO, and does so using a manageable feedback overhead. The increased efficiency and simplicity afforded by the use of factorized precoder feedback 20 (and the associated processing) provide particular advantages for larger antenna configurations.

As further non-limiting examples of various advantages, the disclosed teachings provide: reduced feedback overhead for a given downlink performance; improved downlink performance for a given feedback overhead; decreased computational complexity by reducing the dimensionality of the evaluations used for the dynamic precoder reporting provided by the factorized precoder feedback 20; good suitability for MU-MIMO transmissions, as the conversion precoder recommendations be reported with high resolution in the quantization step.

Additionally, although terminology from 3GPP LTE has been used in various sections of this document to provide meaningful configuration and operational examples, such usage of LTE examples should not be seen as limiting the scope of the teachings presented herein. It is contemplated that these teachings be extended to, for example, WCDMA, WiMax, UMB and GSM. More generally, it should be understood that the foregoing details and the accompanying illustrations provide non-limiting example embodiments of the teachings disclosed herein.

What is claimed is:

1. A method of precoding transmissions from a first device to a second device, said method comprising:
receiving factorized precoder feedback from the second device indicating at least one of a recommended conversion precoder matrix and a recommended tuning precoder matrix that jointly represent a recommended precoder matrix that is a matrix multiplication of the recommended conversion and tuning precoder matrices, wherein said recommended conversion precoder matrix restricts a number of channel dimensions considered by said recommended tuning precoder matrix and said recommended tuning precoder matrix matches said recommended precoder matrix to an effective channel that is defined in part by said recommended conversion precoder matrix;
determining a precoding operation based at least in part on evaluating said recommended precoder matrix; and transmitting a precoded signal to the second device that is precoded according to said precoding operation; and maintaining one or more codebooks of conversion precoder matrices and tuning precoder matrices, and wherein each conversion precoder matrix has row-column dimensions of $N_T \times k$, where $N_T$ is the number of rows and equals a number of transmit antenna ports at the first device and k is the number of columns and equals a conversion dimension and wherein said recommended tuning matrix has dimension k×r, where r is a transmission rank used by the first device, and wherein $N_T$, k and r are related as $N_T \geq k \geq r$ to thereby restrict the number of channel dimensions considered by said recommended tuning precoder matrix.

2. The method of claim 1, wherein evaluating said recommended precoder matrix comprises determining whether or not to use said recommended precoder matrix in said precoding operation for generating the precoded signal.

3. The method of claim 1, further comprising maintaining one or more codebooks as a two-dimensional table of possible precoder matrices, wherein each row or column of said table corresponds to a particular one in a plurality of possible conversion precoder matrices and each column or row of said table corresponds to a particular one in a plurality of possible tuning precoder matrices, and wherein said factorized precoder feedback comprises at least one of a row index value and a column index value, for identifying a particular one of said possible precoder matrices in said table as said recommended precoder matrix.

4. The method of claim 1, further comprising maintaining one or more codebooks of possible conversion precoder matrices and possible tuning precoder matrices, and wherein said factorized precoder feedback comprises at least one index value indicating at least one of: a particular one of said possible conversion precoder matrices as said recommended conversion precoder, and a particular one of said possible tuning precoder matrices as said recommended tuning precoder matrix.

5. The method of claim 4, wherein said maintaining one or more codebooks comprises maintaining a first codebook of said possible conversion precoder matrices and a second codebook of said possible tuning precoder matrices, and wherein said factorized precoder feedback comprises at least one of a first index value for the first codebook and a second index value for the second codebook.

6. The method of claim 1, wherein at least one of said possible conversion precoder matrices comprises a block-diagonal matrix.

7. The method of claim 6, wherein at least one of said possible tuning precoder matrices has matrix rows that change a phasing of the blocks in said block-diagonal matrix.

8. The method of claim 1, wherein said conversion dimension k is configured by said first device or said second device and wherein, in the case that said conversion dimension k is configured by said first device, said method further comprises signaling an indication of said conversion dimension k from said first device to said second device.

9. The method of claim 8, wherein said recommended conversion precoder matrix is configured by said first device, and wherein said method further comprises signaling an indication of said recommended conversion precoder matrix from said first device to said second device.

10. The method of claim 1, further comprising maintaining one or more codebooks of possible conversion precoder matrices and possible tuning precoder matrices, wherein said one or more codebooks includes a set of possible tuning precoder matrices, such that the number of unique vectors forming a particular row of said set of possible tuning precoder matrices is greater than the number of unique vectors forming another row of said set of possible tuning precoder matrices.

11. The method of claim 1, wherein said receiving the factorized precoder feedback from the second device comprises receiving signaling at a first granularity in time or frequency that indicates said recommended conversion precoder matrix, and receiving signaling at a second granularity in time or frequency indicating said recommended tuning precoder matrix, and wherein said first granularity is coarser than said second granularity.

12. A first device configured for precoding transmissions to a second device, wherein said first device comprises:

a receiver configured to receive factorized precoder feedback from the second device indicating at least one of a recommended conversion precoder matrix and a recommended tuning precoder matrix that jointly represent a recommended precoder matrix that is a matrix multiplication of the recommended conversion and tuning precoder matrices, wherein said recommended conversion precoder matrix restricts a number of channel dimensions considered by said recommended tuning precoder matrix and said recommended tuning precoder matrix matches said recommended precoder matrix to an effective channel that is defined in part by said recommended conversion precoder matrix; and a transmitter that includes a precoder circuit and is configured to:

determine a precoding operation based at least in part on evaluating said recommended precoder matrix; and transmit a precoded signal to the second device that is precoded according to said precoding operation; and the first device is configured to maintain one or more codebooks of conversion precoder matrices and tuning precoder matrices, and wherein each conversion precoder matrix has row-column dimensions of $N_T \times k$, where $N_T$ is the number of rows and equals a number of transmit antenna ports at the first device and k is the number of columns and equals a conversion dimension and wherein said recommended tuning matrix has dimension k×r, where r is a transmission rank used by the first device, and wherein $N_T$, k and r are related as $N_T \geq k \geq r$ to thereby restrict the number of channel dimensions considered by said recommended tuning precoder matrix.

13. The first device of claim 12, wherein said transmitter is configured to evaluate said recommended precoder matrix by determining whether or not to use said recommended precoder matrix in said precoding operation used for generating the precoded signal.

14. The first device of claim 12, wherein said first device is configured to maintain one or more codebooks as a two-dimensional table of possible precoder matrices, wherein each row or column of said table corresponds to a particular one in a plurality of possible conversion precoder matrices and each column or row of said table corresponds to a particular one in a plurality of possible tuning precoder matrices, and wherein said factorized precoder feedback comprises at least one of a row index value and a column index value, for identifying a particular one of said possible precoder matrices as said recommended precoder matrix.

15. The first device of claim 12, wherein said first device is configured to maintain one or more codebooks of possible conversion precoder matrices and possible tuning precoder matrices, and wherein said receiver is configured to receive said factorized precoder feedback as at least one index value indicating at least one of: a particular one of said possible conversion precoder matrices as said recommended conversion precoder, and a particular one of said possible tuning precoder matrices as said recommended tuning precoder matrix.

16. The first device of claim 15, wherein said first device is configured to maintain said one or more codebooks by maintaining a first codebook of said possible conversion precoder matrices and a second codebook of said possible tuning precoder matrices, and wherein said factorized precoder feedback comprises at least one of a first index value for the first codebook and a second index value for the second codebook.

17. The first device of claim 12, wherein at least one of said possible conversion precoder matrices comprises a block-diagonal matrix.

18. The first device of claim 17, wherein at least one of said possible tuning precoder matrices has matrix rows that change a phasing of the blocks in said block-diagonal matrix.

19. The first device of claim 17, wherein said conversion dimension k is configured by said first device or said second device and wherein, in the case that said conversion dimension k is configured by said first device, said first device is configured to signal an indication of said conversion dimension k from said first device to said second device.

20. The first device of claim 19, wherein said recommended conversion precoder matrix is selected by said first device, and wherein said first device is configured to signal an indication of said recommended conversion precoder matrix from said first device to said second device.

21. The first device of claim 12, wherein said first device maintains one or more codebooks of possible conversion precoder matrices and possible tuning precoder matrices, and wherein said one or more codebooks includes a set of possible tuning precoder matrices, such that the number of unique vectors forming a particular row of said set of possible tuning precoder matrices is greater than the number of unique vectors forming another row of said set of possible tuning precoder matrices.

22. The first device of claim 12, wherein said first device is configured to receive the factorized precoder feedback from the second device as first signaling received by the first device at a first granularity in time or frequency that indicates said recommended conversion precoder matrix, and second signaling received by the first device at a second granularity in time or frequency indicating said recommended tuning precoder matrix, and wherein said first granularity is coarser than said second granularity.

23. A method at a second device of indicating a recommended precoder matrix to a first device, said method comprising:
estimating channel conditions with respect to said first device;
determining factorized precoder feedback based at least in part on said channel conditions, wherein said factorized precoder feedback indicates at least one of a recommended conversion precoder matrix and a recommended tuning precoder matrix, said recommended conversion and tuning precoder matrices jointly representing a recommended precoder matrix that is a matrix multiplication of the recommended conversion and tuning precoder matrices, and wherein said recommended conversion precoder matrix restricts a number of channel dimensions considered by said recommended tuning precoder matrix and said recommended tuning precoder matrix matches said recommended precoder matrix to an effective channel between said first and second devices that is defined in part by said recommended conversion precoder matrix; and
sending said factorized precoder feedback to said first device to indicate said recommended precoder matrix to said first device; and the method further comprises:
maintaining at said second device one or more codebooks comprising a plurality of conversion precoder matrices, each having row-column dimensions $N_T \times k$, where $N_T$ is the number of rows and equals a number of transmit antenna ports at the first device and k is the number of columns k and equals a conversion dimension and wherein said recommended tuning matrix has dimension $k \times r$, where r is a transmission rank used by the first device, and wherein $N_T$, k and r are related as $N_T \geq k \geq r$ to thereby restrict the number of channel dimensions considered by said recommended tuning precoder matrix.

24. The method of claim 23, further comprising maintaining a two-dimensional table of possible precoder matrices, each one possible for selection as said recommended precoder matrix, and wherein each row or column of said table corresponds to a particular one in a plurality of possible conversion precoder matrices and each column or row of said table corresponds to a particular one in a plurality of possible tuning precoder matrices, and wherein said factorized precoder feedback comprises at least one of a row index value and a column index value, for identifying a particular one of said possible precoder matrices as said recommended precoder matrix.

25. The method of claim 23, wherein said sending of said factorized precoder feedback comprises signaling said recommended conversion precoder at a first granularity in time or frequency and signaling said recommended tuning precoder at a second granularity in time or frequency, wherein said first granularity is coarser than said second granularity.

26. The method of claim 23, wherein at least one of said possible conversion precoder matrices comprises a block-diagonal matrix.

27. The method of claim 26, wherein said one or more codebooks further comprises a plurality of possible tuning precoder matrices, and wherein at least one of said possible tuning precoder matrices has matrix rows that change a phasing of the blocks in said block-diagonal matrix.

28. The method of claim 23, wherein said conversion dimension k is configured by said first device or said second device and wherein, in the case that said conversion dimension k is configured by said first device, said method further includes receiving an indication of said conversion dimension k from said first device.

29. The method of claim 28, wherein said recommended conversion precoder matrix is selected by said first device, and wherein said method further includes receiving an indication of said recommended conversion precoder matrix from said first device.

30. The method of claim 23, further comprising maintaining one or more codebooks at said second device, wherein said one or more codebooks includes a set of possible tuning precoder matrices, such that the number of unique vectors forming a particular row of said set of possible tuning precoder matrices is greater than the number of unique vectors forming another row of said set of possible tuning precoder matrices.

31. A second device configured to indicate a recommended precoder matrix to a first device, said second device comprising:
a receiver configured to:
estimate channel conditions with respect to said first device; and
to determine factorized precoder feedback based at least in part on said channel conditions, wherein said factorized precoder feedback indicates at least one of a recommended conversion precoder matrix and a recommended tuning precoder matrix, said recommended conversion and tuning precoder matrices jointly representing a recommended precoder matrix that is a matrix multiplication of the recommended conversion and tuning precoder matrices, and wherein said recommended conversion precoder matrix restricts the number of channel dimensions considered by said recommended tuning precoder matrix and said recommended tuning precoder matrix matches said recommended precoder matrix to an effective channel between said first and second devices that is defined in part by said recommended conversion precoder matrix; and a transmitter configured to send said factorized precoder feedback to said first device to indicate said recommended precoder matrix to said first device;

the second device is further configured to maintaining at said second device one or more codebooks comprising a plurality of possible conversion precoder matrices, each having row-column dimensions $N_T \times k$, where $N_T$ is the number of rows and equals a number of transmit antenna ports at the first device and k is the number of columns and equals a conversion dimension and wherein said recommended tuning matrix has dimension $k \times r$, where r is a transmission rank used by the first device, and wherein $N_T$, k and r are related as $N_T \geq k \geq r$ to thereby restrict the number of channel dimensions considered by said recommended tuning precoder matrix.

32. The second device of claim 31, wherein said second device is configured to maintain a two-dimensional table of possible precoder matrices, each one possible for selection as said recommended precoder matrix, and wherein each row or column of said table corresponds to a particular one in a plurality of possible conversion precoder matrices and each column or row of said table corresponds to a particular one in a plurality of possible tuning precoder matrices, and wherein said factorized precoder feedback comprises a table index value identifying a particular one of said possible precoder matrices as said recommended precoder matrix.

33. The second device of claim 31, wherein said second device is configured to send said factorized precoder feedback by signaling said recommended conversion precoder at a first granularity in time or frequency and signaling said recommended tuning precoder at a second granularity in time or frequency, wherein said first granularity is coarser than said second granularity.

34. The second device of claim 31, wherein at least one of said possible conversion precoder matrices comprises a block-diagonal matrix.

35. The second device of claim 34, wherein said one or more codebooks further comprises a plurality of possible tuning precoder matrices, and wherein at least one of said possible tuning precoder matrices has matrix rows that change a phasing of the blocks in said block-diagonal matrix.

36. The second device of claim 31, wherein said conversion dimension k is configured by said first device or said second device and wherein, in the case that said conversion dimension k is configured by said first device, said second device is configured to receive an indication of said conversion dimension k from said first device.

37. The second device of claim 36, wherein said recommended conversion precoder matrix is selected by said first device, and wherein said second device is configured to receive an indication of said recommended conversion precoder matrix from said first device.

38. The second device of claim 31, wherein said second device is configured to maintain one or more codebooks, wherein said one or more codebooks includes a set of possible tuning precoder matrices, such that the number of unique vectors forming a particular row of said set of possible tuning precoder matrices is greater than the number of unique vectors forming another row of said set of possible tuning precoder matrices.

* * * * *